United States Patent [19]

Brown et al.

[11] 3,725,307
[45] Apr. 3, 1973

[54] PROCESS FOR PREPARING A SILVER-SUPPORTED CATALYST

[75] Inventors: David Brown, Greenwich, Conn.; Alfred Saffer, Bayside, N.Y.

[73] Assignee: Halcon International, Inc., New York, N.Y.

[22] Filed: Jan. 30, 1967

[21] Appl. No.: 612,731

Related U.S. Application Data

[63] Continuation of Ser. No. 456,003, May 14, 1965, abandoned, which is a continuation-in-part of Ser. No. 142,035, Oct. 2, 1961, abandoned.

[52] U.S. Cl..............252/455 R, 252/476, 260/348.5
[51] Int. Cl. ...........................B01j 11/20, C07d 1/08
[58] Field of Search..............252/455, 454, 476, 443; 260/348.5

[56] References Cited

UNITED STATES PATENTS

| | | | |
|---|---|---|---|
| 2,477,435 | 6/1949 | Aries | 260/348.5 |
| 2,831,870 | 4/1958 | McClements et al. | 260/348.5 |
| 3,172,893 | 3/1965 | Ameen | 252/476 X |
| 3,207,700 | 9/1965 | Saffer | 252/476 X |
| 2,709,173 | 5/1955 | Brengle et al. | 252/476 X |

FOREIGN PATENTS OR APPLICATIONS

| | | | |
|---|---|---|---|
| 592,091 | 2/1960 | Canada | 252/476 |

Primary Examiner—Edward J. Meros
Attorney—T. G. Gillespie, Jr. and William C. Long

[57] ABSTRACT

A sliver-supported catalyst is prepared by immersing a carrier of inert porous particles having an average diameter not larger than 3/16 inch, an average pore diameter of about 10–70 microns, and a surface area less than one square meter per gram in an aqueous solution of a silver salt whereby said particles are impregnated with said solution, separating and drying the impregnated particles, and activating the dried particles by heating in air at a temperature sufficient to decompose the sliver salt. Silica-alumina support particles and a silver salt of an organic carboxylic acid such as lactic acid are preferably used in the process. Optionally, an alkaline earth promoter is added to the silver salt solution. The catalyst product is used in the production of ethylene oxide by the vapor phase oxidation of ethylene.

8 Claims, No Drawings

PROCESS FOR PREPARING A SILVER-SUPPORTED CATALYST

This application is a continuation of application Ser. No. 456,003 filed May 14, 1965, now abandoned, which is a continuation-in-part of application Ser. No. 142,035 filed Oct. 2, 1961, now abandoned.

The present invention relates to a catalyst for the production of ethylene oxide by the vapor phase oxidation of ethylene. More specifically, the present invention relates to a catalyst which is superior in its chemical performance and exhibits greater longevity than those heretofore available even under the severe conditions of the oxidation process. Additionally, the present invention relates to a process for preparing this unique catalyst.

Ethylene oxide is a chemical of extraordinary commercial importance. Several processes have been developed for producing ethylene oxide. However, the most commercially satisfactory process centers about a vapor phase oxidation of ethylene.

The most important single feature of this process resides in the catalyst over which the mixture of ethylene and oxygen and other gases is passed. Considerable effort has been expended in developing catalysts which provide a high yield of ethylene oxide from ethylene.

It is an object of the present invention to provide a catalyst which is superior in its performance to those which have heretofore been available.

It is a further object of this invention to provide a method for preparing this improved catalyst.

Further objectives of the present invention will be obvious from the ensuing disclosure.

Now it has been found that by impregnating a support having certain properties and characteristics with a silver salt solution and drying and activating the impregnated support particles as hereinafter described, there is produced a finished catalyst composition which has outstanding utility in the production of ethylene oxide. It has been discovered that improved production of ethylene oxide results from the use of the catalyst of this invention which has been prepared as hereinafter defined.

In accordance with this invention, spherical-type support particles having an average particle diameter up to about 3/16 inch may be employed. "Spherical" particles are not perfectly spherical of course and particle diameters are approximate (varying ±15 percent). Other particle configurations having an equivalent diameter of up to about 3/16 inch may also be used (equivalent diameter being defined as the diameter of a sphere having the same external surface to gross volume ratio as the particles under consideration). As used hereinafter the particle diameters for spherical particles refer to manufacturers' designation.

The average pore diameter of these particles is at least 10 microns and is preferably in the range of about 10 to 70 microns. The surface area (including area of the pores) of the support particles is low, being less than about 1 square meter per gram and is preferably in the range of about 0.1 to 0.2 square meters per gram. Preferably silica-alumina support particles are used, although other materials can be used.

It has been found that catalyst supports having the dimensions specified hereinabove, that is, the specified particle size coupled with the average pore diameter indicated and the stated surface are most satisfactory for the production of ethylene oxide in outstanding yields.

It has been found that by impregnation of the said support particles with a solution of a silver compound such as silver lactate and suitable drying and activation, finished catalyst compositions containing silver are obtained which are eminently useful and suited for the production of ethylene oxide by the partial oxidation of ethylene.

In preferred practice, an impregnating solution in water of a silver salt of an organic carboxylic acid such as lactic acid is formed. Most preferably, silver oxide is added to an aqueous solution of an organic acid such as lactic acid and reacted to form a solution of the silver salt such as silver lactate. Silver salts of other acids such as oxalic, valeric, and the like can be employed.

It is desirable to form a highly concentrated solution of the silver salt, e.g., 60 to 75 percent, in order to achieve high silver concentration in the final catalyst composition. However, silver salt solutions having a concentration broadly in the range of about 25 to 80 percent can be employed.

It is usually desirable to add a small amount of an oxidizing agent such as hydrogen peroxide to prevent reduction of silver compound and precipitation of metallic silver during or before the support particle impregnation.

An alkaline earth promoter, most suitably barium, can be added to the silver salt solution, for example, as an aqueous barium lactate solution. The promoter is added in amount of about 1 to 25 percent by weight of silver in the catalyst.

The catalyst support particles are impregnated by complete immersion in the said solution. After a suitable soaking time, for example, 5 to 15 minutes or longer, the impregnated particles are separated from the remainder of the solution as by filtration. It is important during the soaking that the temperature be maintained at about the temperature of 90° to 95°C.

The impregnated particles are dried at a moderate temperature, desirably in the range of about 20° to 175°C. and preferably about 75° to 150°C. for at least 10 hours in an air atmosphere.

After drying, the catalyst particles are activated by heating to a sufficient temperature to decompose the organic silver salt. Desirably, the dried particles are gradually heated in an atmosphere of air to a temperature in the range of about 200° to 300°C. or higher and then held at this temperature for a sufficient time to complete the activation.

The finished catalyst composition contains about 5 to 25 percent by weight of silver. The support particles can be subjected to multiple impregnations with an intermediate insolubilization treatment to obtain catalysts with very high silver content.

The catalyst is employed in the production of ethylene oxide by the oxidation with molecular oxygen of ethylene. Oxidation conditions such as those previously known in the art can be employed. These conditions usually involve reaction temperature in the range of about 150° to 400°C. and usually 200° to 300°C. The reaction pressure is usually 50 to 500 psig and the gaseous feed mixtures contain 0.5 to 10 percent ethylene, 3 to 20 percent oxygen, and the remainder inerts such as nitrogen and $CO_2$. Recycle operations are preferably employed whereby a portion of the ethylene is reacted per pass. After separation of product ethylene oxide the unreacted ethylene is recycled to the reaction. Sufficient of the recycle gas is purged to prevent build up of inerts in the system. The purge gas is appropriately oxidized in a high conversion oxidation to recover as much ethylene oxide as possible.

The following example illustrates the present invention. Except where otherwise indicated, parts and percentages are by weight.

EXAMPLE I

To 1224 parts of an 85 percent solution of lactic acid in water there is added slowly with stirring 1,000 parts of silver oxide over a period of about 30 to 45 minutes. During the silver oxide addition the mixture is cooled to prevent the temperature from rising above 95°C. After addition of all of the silver oxide, 100 parts of 15 percent hydrogen peroxide in water is slowly added to the mixture. A clear yellow silver lactate solution results, and to this solution is added 39 parts of a 44.4 percent aqueous barium lactate solution.

The support particles employed in this embodiment of the invention are 3/16-inch average diameter spheres having the following composition and characteristics:

| | |
|---|---|
| $Al_2O_3$, % | 86.96 |
| $SiO_2$, % | 11.65 |
| $Fe_2O_3$, % | 0.30 |
| $TiO_2$, % | 0.42 |
| CaO, % | 0.05 |
| $Na_2O$, % | 0.32 |
| MgO, % | 0.11 |
| $K_2O$, % | 0.17 |
| Apparent porosity, % | 40.44 |
| Water absorption, % | 19.23 |
| Bulk density, g./cc. | 1.9 – 2.1 |
| Apparent specific gravity, g./cc. | 3.4 – 3.6 |
| Packing density, lbs/cu.ft. | 70.74 |
| Surface area, sq. meters/gm. | Below 1 |
| Average pore diameter, microns | 10 – 15 |

The support particles are preheated to a temperature of about 90° to 100°C and are then immersed and completely submerged in the silver lactate solution which is maintained at a temperature of 90° to 95°C. After an immersion and soaking time of 5 to 15 minutes with occasional stirring, the impregnated support particles are separated from the remaining solution by draining.

The impregnated support particles are drained for about 15 minutes and are then dried for at least 10 hours at a temperature of 60° to 70°C. in an air atmosphere. The thusly dried impregnated particles are heated gradually over a period of about four hours to a temperature of 250°C. in an air atmosphere, and maintained at 250°C. for an additional four hours in order to complete the activation. The finished catalyst contains 10.88 percent by weight silver.

The activated catalyst is employed in the production of ethylene oxide by the partial oxidation of ethylene with molecular oxygen. A gaseous mixture containing about 5 percent ethylene, 6 percent oxygen, 5 percent $CO_2$, and the remainder nitrogen is passed over said catalyst at a space velocity of 600 liters of gas (STP) per liter of catalyst per hour at a temperature of about 250°C. and at a pressure of about 240 psig.

There is a conversion of about 25 percent of the ethylene per pass with a molar selectivity to ethylene oxide of about 73 percent.

By way of comparison, a catalyst was prepared as above except that the support particles were ¼ inch in average diameter and average pore diameter was 8.9 microns. The catalyst had about 9.5 percent by weight silver. When employed in ethylene oxidation as above described, about 12 percent ethylene conversion with about 65 percent selectivity to ethylene oxide results.

Additionally, by way of comparison, a catalyst was prepared as above except that the support particles were 5/16 inch in average diameter and average pore diameter as 6.5 microns. When employed in ethylene oxidation as above described, about 16 percent ethylene conversion with about 62 percent selectivity to ethylene oxide results.

It has now been discovered that best results in ethylene oxide production are achieved with catalysts having a support size not in excess of 3/16 inch. With such catalysts, significantly higher productivity of ethylene oxide (expressed as pounds ethylene oxide produced per pound of catalyst per hour) is achieved than with larger support sizes. The improved results with the smaller support sizes are illustrated by the following example:

EXAMPLE II

Ethylene oxide catalysts were prepared on silica alumina supports of 3/16, 4/16 and 5/16 inch diameters. Each support had a porosity of about 49 to 54 percent. The catalysts were prepared in the following manner:

To 495 parts of an 85 percent solution of lactic acid in water were added slowly, with stirring, 408 parts of silver oxide over a period of about 2 to 8 hours. During the silver oxide addition the mixture was cooled to prevent the temperature from rising above 95°C. After addition of all of the silver oxide, 50 parts of 15 percent hydrogen peroxide in water was slowly added to the mixture. A clear yellow silver lactate solution resulted, and to this solution was added 125 parts of a 60 percent aqueous barium lactate solution.

The support particles employed had the following composition and characteristics:

| | |
|---|---|
| $Al_2O_3$, % | 86.96 |
| $SiO_2$, % | 11.65 |
| $Fe_2O_3$, % | 0.30 |
| $TiO_2$, % | 0.42 |
| CaO, % | 0.05 |
| $Na_2O$, % | 0.32 |
| MgO, % | 0.11 |
| $K_2O$, % | 0.17 |
| $ZrO_2$ + $HfO_2$ | 0.02 |
| Apparent porosity, % | 49 – 54% |
| Water absorption, % | 27 – 31 |
| Bulk density, g./cc. | 1.6 – 1.8 |
| Apparent specific gravity, g./cc. | 3.4 – 3.6 |
| Packing density, lbs/cu.ft. | 58 – 63 |
| Surface area, sq. meters/gm. | Less than 1 |
| Average pore diameter, microns | 25 |

The support particles were preheated to a temperature of about 80° to 120°C. and were then immersed and completely submerged in the silver lactate solution which was maintained at a temperature of 80° to 120°C. After an immersion and soaking time of 30 to 60 minutes with occasional stirring, the impregnated support particles were separated from the remaining solution by draining.

The impregnated support particles were drained for about 15 minutes and were then dried for 12 hours at a temperature of 100° to 150°C. in an air atmosphere. The dried impregnated particles were heated from 130°C. to 250°C. over a six hour period, in an air atmosphere, and were then heated to 350°C. and maintained at 350°C. for an additional 1 to 2 hours in order to complete the activation. The finished catalyst contained 15 percent silver.

The activated catalyst was employed in the production of ethylene oxide by the partial oxidation of ethylene with molecular oxygen. A gaseous mixture containing about 5 percent ethylene, 6 percent oxygen, 6% $CO_2$, and the remainder nitrogen was passed over said catalyst at a space velocity of 7,000 liters of gas (STP) per liter of catalyst per hour at a temperature of 245°C. and at a pressure of about 300 psig.

The performance of the three catalysts prepared as hereinabove described are set out below:

| Support Diameter inches (manufacturers designation) | Approximate selectivity of reaction, % | Relative catalyst productivity, % | Ethylene oxide concentration in product gas, % |
|---|---|---|---|
| 5/16 | 70 | 100 | 0.70 |
| 4/16 | 70 | 116 | 0.89 |
| 3/16 | 70 | 134 | 1.06 |

The above table shows that the 3/16 inch support has the best productivity. A higher productivity means that less of the expensive silver catalyst is required to produce a given quantity of ethylene oxide. Thus considerable cost savings are made by using the 3/16 inch support.

The savings may be appreciated in yet another way. Since the productivity of the catalyst may, in general, be increased with increased reaction temperature it is possible to achieve the same productivity with 3/16 inch catalysts operating at lower temperatures, as with larger catalysts operating at higher temperatures. Normally, catalyst life is longer when the catalyst is operated at lower temperatures, other conditions being equal. Thus at equal productivities the 3/16 inch catalyst normally needs less frequent replacement than larger particle sizes.

In general the support particles which exhibit superior performance may be from 1/16 inch to 3/16 inch. Handling problems and excessive pressure drop make the use of support particles much less than 1/16 inch unsatisfactory.

A further important discovery is that if 3/16 inch or smaller supports having high porosity, that is, a porosity of at least 48 percent, are used in the preparation of the catalysts of this invention, these catalysts perform more efficiently than do similar catalysts prepared using supports of lower porosity. The important improvements obtained through the use of the higher porosity supports are illustrated by the following example:

EXAMPLE III

A 3/16 inch silica alumina support having the characteristics set forth in Example II except that the porosity is from about 37 to 41 percent was prepared as described in Example II. An identical catalyst having a porosity of about 48 to 54 percent was similarly prepared. The catalysts were tested under equivalent conditions in the following process: A gaseous mixture containing about 5 percent ethylene, 6 percent oxygen, 6 percent carbon dioxide and the remainder nitrogen was passed over the catalysts at a space velocity of 620 liters of gas (STP) per liter of catalyst per hour at a temperature of about 245°C. and at a pressure of about 1 atmosphere. The following results were obtained.

| Support | Porosity | Selectivity,% | Ethylene oxide concentration in product gas, % |
|---|---|---|---|
| A | 37 - 41 | 71.9 | 0.33 |
| B | 43 - 54 | 73.0 | 1.25 |

The above table shows that the more porous support has a higher productivity and more selectively oxidizes the ethylene.

The higher productivity allows, as indicated above, less catalyst to be used to produce a given quantity of ethylene oxide or alternatively insures longer catalyst life at the same productivity.

The advantages to be gained by using the higher porosity support include as well however, a more selective oxidation. Thus less raw material ethylene is required to produce a given quantity of ethylene oxide.

Several manufacturing processes were investigated for producing the catalyst described above. The methods described in U.S. Pat. No. 2,477,435 and Canada Pat. No. 592,091 were employed among others and the catalysts prepared thereby though not unsatisfactory were inferior in chemical activity.

It was discovered that if the impregnated catalyst was activated in an oxygen containing atmosphere rather than the hydrogen or nitrogen atmosphere taught in the prior art a substantially more active catalyst could be obtained.

The following example illustrates the effect of an air activation.

EXAMPLE IV

High porosity (49 to 54 percent) 3/16 inch silica alumina supports having the characteristics disclosed in Example II above were prepared according to the scheme described in Example II with one exception. After the impregnation and drying steps had been accomplished the catalysts were separated into three portions. Each portion was activated by a different process.

The first portion was activated with hydrogen by heating the catalyst in an atmosphere of hydrogen at 150° to 250°C. for a period of about 16 hours. A hydrogen flow of approximately 3 to 20 liters per hour per pound of catalyst was used to provide sufficient excess hydrogen to accomplish the reduction of the catalyst.

The second portion was activated in a nitrogen atmosphere by maintaining it at a temperature of from 300° to 500°C. for a period of 15 hours. The flow rate of nitrogen during the activation was 8 to 25 liters per hour per pound of catalyst.

The third portion of catalyst was activated in an air atmosphere by maintaining the catalyst at a temperature of 150° to 250°C. for a period of 15 hours. The flow rate of air was 100 liters per pound of catalyst.

The three batches of catalyst were tested under equivalent conditions in an ethylene oxide reactor. The reaction conditions were as recited in Example III.

The following results were obtained:

| Activation scheme | Selectivity of reaction, % | Ethylene oxide Concentration in product gas, % |
|---|---|---|
| hydrogen atmosphere | 51.0 | 0.14 |
| nitrogen atmosphere | 69.0 | 1.20 |
| air atmosphere | 71.1 | 1.53 |

The above table shows that the air activated catalyst has the highest productivity and thus has the dual advantages described above. It should also be noted from the above table that although the productivity of the air activated catalyst is greater than that of the other catalysts at the same temperature the selectivity of the reaction is not only as high but is in fact higher than that for the other two catalysts. Thus there is a selectivity advantage as well as the higher productivity.

The catalyst activation may be carried out with any oxygen containing gas. Desirably the gas should contain at least 10 percent (by volume) oxygen and pure oxygen can be used. For obvious reasons air is the preferred medium.

The activation can be carried out at from 150° to 400°C. but desirably is carried out at from 175° to 375°C. and preferably is carried out at from 200° to 350°C.

The activation will be complete in from ½ to 24 hours depending upon the temperature. It is preferred to activate for from 5 to 16 hours.

The activation may be carried out with no flow of oxygen bearing gas or the flow may be as high as 500,000 liters per hour per pound of catalyst; but desirably it is from 3,000 to 175,000 liters per hour per pound of catalyst.

From the foregoing disclosure modifications of the inventive scheme will be apparent to those skilled in the art. It is intended to include within the invention all such modifications except as do not come within the scope of the claims appended.

What is claimed is:

1. A process for preparing a silver-supported catalyst for the improved production of ethylene oxide, said process comprising the steps of forming an aqueous solution of silver salt, immersing completely in said solution a carrier of inert, porous particles characterized by an average diameter not larger than about 3/16 inch, an average pore diameter of about 10 to 70 microns, and a surface area less than about one square meter per gram, impregnating said particles with said solution by soaking said particles therein for a period of at least about 5 minutes at a temperature of about 90° to 95°C, thereby permitting capillary action to fill effectively the pores of said particles with said solution, separating the impregnated particles from the remainder of said solution, drying the separated particles, whereby said silver salt is deposited uniformly throughout the pores of said particles, and activating the dried particles by heating them in air at a temperature sufficient to decompose the deposited silver salt.

2. A process according to claim 1 wherein the step of activating is carried out by heating the dried particles gradually to a temperature of 200° to 300°C. and thereafter maintaining said temperature for a period of time sufficient to decompose said silver salt.

3. A process according to claim 1 wherein the aqueous solution formed comprises 25 to 80 percent by weight of said silver salt.

4. A process according to claim 3 wherein said aqueous solution is formed by the addition of silver oxide to an aqueous solution of a carboxylic acid.

5. A process according to claim 4 wherein said acid is lactic acid.

6. A process according to claim 1 wherein the aqueous solution formed comprises an effective amount of an oxidizing agent to prevent reduction of said silver salt and precipitation of metallic silver prior to impregnation.

7. A process according to claim 1 wherein the aqueous solution formed comprises an alkaline earth promoter.

8. A process according to claim 1 wherein the step of drying is carried out by heating the separated particles in air at a temperature of 20° to 175°C. for a period of at least 10 hours.

* * * * *